United States Patent
Carlstedt et al.

(10) Patent No.: US 12,384,318 B2
(45) Date of Patent: Aug. 12, 2025

(54) AIRBAG SYSTEM FOR A RESTRAINT SYSTEM AND RESTRAINT SYSTEM HAVING A SAFETY BELT DEVICE AND AN AIRBAG SYSTEM

(71) Applicant: AUTOLIV DEVELOPMENT, Vargarda (SE)

(72) Inventors: Lars Carlstedt, Vargarda (SE); Mateusz Kedzierski, Czerwieńsk (PL); Mikael Dahlgren, Alingsas (SE); Patrik Ivarsson, Alingsas (SE); Goran Karlsson, Vargarda (SE); Elin Davidsson, Vargarda (SE); Per Axblom, Alingsas (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/558,310

(22) PCT Filed: Apr. 29, 2022

(86) PCT No.: PCT/EP2022/061512
§ 371 (c)(1),
(2) Date: Oct. 31, 2023

(87) PCT Pub. No.: WO2022/233729
PCT Pub. Date: Nov. 10, 2022

(65) Prior Publication Data
US 2024/0351545 A1    Oct. 24, 2024

(30) Foreign Application Priority Data
May 4, 2021  (DE) .................. 10 2021 111 522.1

(51) Int. Cl.
*B60R 21/18*  (2006.01)
*B60R 21/233*  (2006.01)
(Continued)

(52) U.S. Cl.
CPC ............ *B60R 21/18* (2013.01); *B60R 21/233* (2013.01); *B60R 21/264* (2013.01); *B60R 22/18* (2013.01); *B60R 2022/1806* (2013.01)

(58) Field of Classification Search
CPC .............................. B60R 21/233; B60R 21/18
See application file for complete search history.

(56) References Cited

U.S. PATENT DOCUMENTS 5,871,230 A * 2/1999 Lewis ................. B60R 22/14
                                                280/743.1
6,209,908 B1  4/2001 Zumpano
(Continued)

FOREIGN PATENT DOCUMENTS

CN       112744178 A  *  5/2021  ............. B60N 2/002
CN       116368041 A  *  6/2023
(Continued)

*Primary Examiner* — Nicole T Verley
(74) *Attorney, Agent, or Firm* — DICKINSON WRIGHT PLLC

(57) ABSTRACT

An airbag system for a restraint system having an inflatable airbag, and a gas generator which is fluidically connected to the airbag and which inflates the airbag when activated with a gas, the airbag has a retainer for retaining on a safety belt of the safety belt device, the airbag has a main chamber fluidically connected to the gas generator and which, in a fastening position of the airbag system predetermined by the retainer, rests against the safety belt, and at least one additional chamber is provided on the side of the main chamber facing away from the safety belt and is separated from the main chamber by means of a partition wall, and at least one opening, via which the additional chamber is fluidically connected to the main chamber, is provided in the partition wall.

16 Claims, 8 Drawing Sheets

(51) Int. Cl.
*B60R 21/264* (2006.01)
*B60R 22/18* (2006.01)

(56) References Cited

U.S. PATENT DOCUMENTS

| | | | | |
|---|---|---|---|---|
| 7,665,761 | B1* | 2/2010 | Green | B60R 21/233 280/730.2 |
| 11,014,520 | B2* | 5/2021 | Murakami | B60R 22/14 |
| 11,390,232 | B2* | 7/2022 | Fischer | B60R 21/239 |
| 11,400,883 | B2* | 8/2022 | Yamada | B60R 21/206 |
| 11,648,905 | B2* | 5/2023 | Yamada | B60R 21/2338 280/730.1 |
| 11,787,358 | B2* | 10/2023 | Fukaura | B60R 21/20 280/733 |
| 2001/0052692 | A1 | 12/2001 | Buerkle et al. | |
| 2006/0028004 | A1 | 2/2006 | Oota et al. | |
| 2014/0159350 | A1 | 6/2014 | Schneider et al. | |
| 2015/0069741 | A1 | 3/2015 | Shimazu | |
| 2018/0281727 | A1* | 10/2018 | Jenny | B60R 21/231 |
| 2018/0290615 | A1* | 10/2018 | Humbert | B64D 11/06205 |
| 2019/0299899 | A1* | 10/2019 | Einarsson | B60R 21/233 |
| 2021/0300277 | A1* | 9/2021 | Fukaura | B60R 21/18 |
| 2021/0354647 | A1 | 11/2021 | Steinke et al. | |
| 2022/0048460 | A1* | 2/2022 | Yamada | B60R 21/207 |
| 2024/0067118 | A1* | 2/2024 | Matsuzaki | B60R 21/18 |

FOREIGN PATENT DOCUMENTS

| | | | | |
|---|---|---|---|---|
| DE | 102017209417 A1 | * | 12/2018 | |
| DE | 102017216180 A1 | * | 3/2019 | B60R 21/18 |
| DE | 102019128376 A1 | * | 4/2020 | B60R 21/00 |
| DE | 102020207208 B3 | * | 4/2021 | |
| DE | 102021000984 A1 | * | 4/2021 | |
| DE | 102020212537 A1 | * | 4/2022 | |
| DE | 102021118495 A1 | * | 1/2023 | |
| DE | 202022103214 U1 | * | 11/2023 | |
| DE | 112022002443 T5 | * | 5/2024 | B60R 21/01 |
| EP | 1669253 A2 | * | 6/2006 | B60R 21/18 |
| EP | 2116427 A2 | * | 11/2009 | B60R 21/0134 |
| EP | 4159550 A1 | * | 4/2023 | B60R 21/18 |
| JP | 11189117 A | | 7/1999 | |
| JP | 2005297917 A | * | 10/2005 | B60R 21/18 |
| WO | WO-2020057992 A1 | * | 3/2020 | B60R 21/013 |
| WO | WO-2022097459 A1 | * | 5/2022 | |

* cited by examiner

AIRBAG SYSTEM FOR A RESTRAINT SYSTEM AND RESTRAINT SYSTEM HAVING A SAFETY BELT DEVICE AND AN AIRBAG SYSTEM

CROSS-REFERENCE TO RELATED APPLICATIONS

This application is a 35 U.S.C. § 371 national phase of PCT International Application No. PCT/EP2022/061512, filed Apr. 29, 2022, which claims the benefit of priority under 35 U.S.C. § 119 to German Patent Application No. 10 2021 111 522.1, filed May 4, 2021, the contents of which are incorporated herein by reference in its entirety.

FIELD OF THE INVENTION

The present invention relates to an airbag system for a restraint system having the features of the preamble of claim 1, and a restraint system having a safety belt device and an airbag system according to the preamble of claim 11 or 12.

BACKGROUND

Safety belt devices for motor vehicles have long been known in the prior art and serve to restrain the occupants in the event of an accident in order to prevent serious injury. For this purpose, safety belt devices having a safety belt designed as a 3-point belt have proven particularly successful, in which devices the safety belt is fastened by one end to the vehicle structure via an end fitting on a lower side of a vehicle seat, and can be taken up with the other end on a belt retractor fastened to the same side. A belt tongue is guided so as to be displaceable on the safety belt, which belt tongue can be locked on a belt buckle arranged on the other side of the vehicle seat, in order to realize the 3-point geometry of the safety belt. In the locked position, the belt tongue then divides the safety belt into a diagonal belt section crossing the chest of the occupant, and a lap belt section crossing the pelvis of the occupant.

Furthermore, airbag systems have long been known in the prior art, which can be arranged at different locations in the vehicle and have an airbag which, in the event of an accident, is inflated suddenly to a significantly increased volume via a gas generator. For example, front airbags, side airbags, curtain airbags, knee airbags, overhead airbags are known, which restrain the occupants in special accident scenarios due to their arrangement and deliberately designed inflation behavior and their inflation geometry, and in particular prevent an impact of the occupant against the interior vehicle structure in the event of an accident. A particularly important airbag is the front airbag, which is arranged in the steering wheel for the driver, and in the instrument panel for the front-seat passenger. When front airbags are also provided for occupants on the back seats, these are arranged in the backrests or the head rests of the front seats. The front airbag basically serves to capture an occupant, sitting facing the direction of travel, in the event of a frontal impact, and to protect him from striking his head or the upper body on the interior vehicle structure or on the inside of the windshield. If such an impact cannot be prevented in the event of a very serious accident, at least the impact momentum can be reduced thereby.

In modern vehicles, restraint systems having a combination of restraint of the occupants by a safety belt and an airbag system have proven to be particularly useful, the restraint of the occupant being achieved in an initial phase via the safety belt and in a later phase of the forward displacement via the airbag system. In this case, the load on the occupant can be further reduced by a targeted use of irreversible or reversible belt tensioners and force-limiting devices, and the forward displacement can thereby be controlled.

However, despite the considerable reduction in the load on the occupant, a disadvantage of such restraint systems can be seen in that the restraint requires a certain orientation of the occupants in relation to the airbag systems, in particular in the case of restraint by the airbag systems. In this case, what are known as "out of position" (OOP) situations are particularly problematic, if the occupant is, for example, bending down into the footwell, is in an extreme sleeping position, or is turned towards the back seats. The effect of the airbag system is considerably reduced as a result. Although the airbag is then inflated, the occupant executes a completely different movement due to being OOP, and is then not caught by the airbag system. Furthermore, although the safety belt devices and the airbag systems are fastened to the vehicle independently of one another, which of itself already increases the assembly effort, they must nevertheless be matched to one another in their restraint characteristics, even in their separate arrangement, which results in a considerable complexity in the design.

A restraint system having a combination of a safety belt device and an airbag system arranged on the safety belt of the safety belt device is already known from US 2014/0159350 A1, in which the occupant is restrained both by the safety belt and by the airbag system which deploys on the safety belt. In this case, the airbag system comprises an inflatable airbag having a chamber which is held on the pelvis belt section or diagonal belt section and which when activated deploys in front of the upper body of the occupant.

Against this background, the invention is based on the object of creating an airbag system held on a safety belt by a retainer, and a restraint system, which are intended to enable an improved restraint of an occupant sitting in a vehicle seat.

According to the basic concept of the invention, an airbag system according to the preamble of claim 1 is proposed, in which the airbag has a main chamber which is fluidically connected to the gas generator and which rests against the safety belt in a fastening position of the airbag system that is predetermined by the retainer, and at least one additional chamber is provided on the side of the main chamber facing away from the safety belt, which additional chamber is separated from the main chamber via a partition wall, and at least one opening is provided in the partition wall, via which the additional chamber is fluidically connected to the main chamber.

In contrast to the solution known from the prior art, in which the airbag on the safety belt has just one single chamber, it is proposed here that the airbag should have two chambers, namely a main chamber and an additional chamber, the main chamber being fluidically connected to the gas generator and the additional chamber being fluidically connected to the main chamber via openings. In this case, the additional chamber is deliberately arranged on the side of the main chamber facing away from the safety belt, and the main chamber is fluidically connected to the gas generator, so that an improved restraint characteristic is achieved here, in that the main chamber is inflated first, via the fluidic connection to the gas generator, and, due to the arrangement of the additional chamber on the side facing away from the safety belt, i.e. facing away from the occupant, then forms a capture surface for the occupant in an early phase of the forward displacement that is starting. Due to the fluidic connection to the main chamber, the additional chamber provided on the main chamber is then inflated only in a later phase of the restraint, by the overflow of the gas via the at least one opening from the main chamber on the side of the main chamber facing away from the occupant. Here, the opening intendedly acts as a restrictor for a stepwise inflation of the main chamber and additional chamber. In this case, the forces absorbed by the main chamber are introduced into the vehicle structure via the safety belt, in order to restrain the occupant. Assuming that the occupant's safety belt is fastened, the main chamber is thereby automatically arranged in a prespecified alignment relative to the occupant during its deployment, namely independently of the orientation and position of the occupant. This is advantageous in particular if the seat has a very large adjustment range, as is the case, for example, in self-driving vehicles in which, in the extreme case, the vehicle seats are also designed to be rotatable by 180 degrees, so that the occupant sitting thereon is oriented so as to have a viewing direction counter to the direction of travel. Due to the inflated main chamber, in an early phase of the accident the occupant is already being held in a position favorable for further forward displacement in addition to the restraint via the safety belt, and movements unfavorable to restraint are at least reduced. The additional chamber provided on the main chamber serves to create a distance between the main chamber and adjacent components or objects in the region of the forward displacement path, and thus to increase the available forward displacement path of the occupant, in that the additional chamber, by virtue of its deployment, virtually presses open or keeps free the free space or pushes the already inflated main chamber against the occupant, in the form of an abutment. Furthermore, the additional chamber then serves, during the forward displacement of the occupant already resting against the main chamber, for damping the further forward displacement of the occupant, and thus for additional energy absorption and additional reduction of the load on the occupant.

It is further proposed that, in the inflated form, the additional chamber extends over the entire width of the main chamber. The forward displacement of the occupant resting against the main chamber is thus damped over the entire width of the main chamber, and a maximum free space can be created for the forward displacement.

It is furthermore proposed that, in the inflated form, the additional chamber has, in a cross-section oriented perpendicularly to the main chamber, a nose shape protruding from the main chamber and having a thickness that decreases starting from the main chamber. The vertical with respect to the main chamber corresponds to the direction of the forward displacement to be damped. Due to the proposed cross-sectional shape of the additional chamber, the forward displacement is damped with progressive damping, such that the occupant is captured more gently and with an increasing counterforce.

It is further proposed that, in the inflated state, the main chamber has a planar geometry with an approximately constant thickness. The main chamber thus forms an extensive and essentially flat support surface for the occupant after inflation, into which the occupant's upper body and head plunge.

It is further proposed that, in the inflated state, the main chamber has a geometry having an elongate central section and two edge sections, the edge sections being arranged on the opposite elongate longitudinal sides of the central section and being of a smaller width than the central section. The central section is designed to be elongate, having two opposite longitudinal sides and two opposite transverse sides, the edge sides being designed to be substantially longer than the transverse sides. Furthermore, the central section is shaped and aligned by the fastening of the airbag system to the diagonal belt section such that it is oriented substantially horizontally and transversely to the forward displacement direction. In the inflated state, with the central section and the edge sections the main chamber thus has a geometry approximately of a diamond. Due to the wider central section, the occupant is restrained in this section over the greatest possible width, for example at the height of the shoulders. In the edge sections with the smaller width, which adjoin the elongate longitudinal sides of the horizontally aligned central section, the occupant is restrained in the region of his head and his upper body adjacent below the shoulders. In this case, the more stable central section having the greater width acts as a type of dimensionally stable hinge, relative to which the two edge sections can pivot for adaptation to the body geometry which changes during the forward displacement of the occupant.

It is further proposed that in the inflated state of the main chamber the central section and the edge sections form approximately one plane. The main chamber thus forms a flat capture surface for the occupant, into which the occupant plunges with the beginning forward displacement movement.

It is further proposed that in the central section the additional chamber is connected to the main chamber. Due to its greater width, the central section forms the dimensionally more stable section of the main chamber, such that the additional chamber connected thereto is supported particularly well for exercising its damping function. Furthermore, the width of the additional chamber can be designed to be greater, corresponding to the greater width of the central section, as a result of which the damping effect can be maximized.

It is further proposed that, in the inflated state, the main chamber and the additional chamber have a geometry symmetrical to a central axis extending through the edge sections and the central section. Due to the proposed symmetrical geometry of the main chamber and the additional chamber, the airbag system does not have a preferred restraint direction apart from a momentum acting perpendicularly to the main chamber. The restraint characteristic of the airbag system can thus be designed to be as identical as possible for identical angles of acting oblique momentum in relation to the orthogonal.

In this case, at least two openings can be provided in the partition wall, which openings are arranged symmetrically to the central axis. Due to the proposed at least two symmetrically arranged openings, the additional chamber is inflated symmetrically to the central axis, and thus as uniformly as possible. If more than two openings are provided, the number of openings will always be an even number of openings, in each case half of the openings being arranged symmetrically to the central axis on the one side of the central axis, and the other half of the openings being arranged on the other side of the central axis at an identical distance from the central axis.

It is furthermore proposed that in the inflated state the main chamber has an asymmetrical geometry with respect to a central axis extending through the edge sections and the central section, and the lower edge section has a lower edge extending obliquely with respect to a horizontal plane, the edge section extending further downward on the side facing the vehicle interior than on the side facing the vehicle exterior. The advantage of this solution is to be seen in that the main chamber, on its side facing toward the vehicle interior, thereby receives better and above all earlier support in that it can be supported earlier, by the edge side extending further downwards, on the leg of the occupant directed toward the vehicle interior. In this way, it is possible to prevent the airbag system from getting between the legs of the occupant with its main chamber during the forward displacement of the occupant.

Furthermore, in order to achieve the object, a restraint system of a motor vehicle for restraining an occupant sitting in a vehicle seat by a safety belt device having a safety belt according to claim 11 is proposed, the safety belt having a diagonal belt section crossing the chest of the occupant, and an airbag system having the features of any one of claims 1 to 9 is arranged on the diagonal belt section. Furthermore, in order to achieve the object, a restraint system of a motor vehicle for restraining an occupant sitting in a vehicle seat by a safety belt device having a safety belt according to claim 12 is proposed, the safety belt having a diagonal belt section crossing the chest of the occupant, and an airbag system having the features of claim 10 is arranged on the diagonal belt section. The proposed restraint systems are advantageous in that the occupant is intendedly restrained in the region of the upper body, by the arrangement of the airbag system on the diagonal belt section. Furthermore, the forward displacement movement of the upper body is damped in a purposeful manner by the additionally provided additional chamber arranged according to the invention.

In this case, a particularly effective restraint of the occupant thereby results, in that the airbag system is positioned on the diagonal belt section by means of a retainer in such a way that the inflated main chamber is arranged having the central section at the height of an upper edge of a backrest of the vehicle seat. Due to the proposed arrangement or alignment of the main chamber and the central section, the occupant is deliberately restrained in his shoulder region by the central section, since the shoulder region is always arranged at least approximately in the region of the upper edge of the backrest when the occupant is sitting in a normal seated posture.

It is further proposed that the safety belt device of the restraint system has two belt retractors which roll up the safety belt from different ends. Due to the two belt retractors, the safety belt can be rolled up from two ends, such that the airbag system does not have to be wound up during a corresponding positioning on the safety belt for a complete winding-up of the safety belt. If the safety belt is designed as a 3-point belt, the two belt retractors would each be arranged on the ends of the diagonal belt section and of the lap belt section fixed to the vehicle, such that the diagonal belt section and the lap belt section are wound up separately. For this purpose, the diagonal belt section and the lap belt section can additionally be connected to the belt tongue via separate fastenings and thereby be designed as separate belt sections, so that the belt retractor of the lap belt section exclusively rolls up the lap belt section, and the belt retractor of the diagonal belt section exclusively rolls up the diagonal belt section. It can thus be ensured that the airbag system held on the diagonal belt section is precisely arranged by its positioning on the diagonal belt section in such a way that it does not have to be wound up on the belt retractor for a complete winding-up of the diagonal belt section into the parked position. The advantage of this solution is to be considered that complete winding-up of the safety belt is possible using conventional belt retractors despite the arrangement of the airbag system, since the airbag system does not have to be wound onto the belt shaft of the belt retractor for this purpose. A conventional safety belt can thus be provided, which is wound onto the two belt retractors, and the airbag system is then arranged on a section of the diagonal belt section which is not wound onto the belt shaft of the belt retractor, even when the diagonal belt section is completely wound up into the parked position, and instead hangs freely next to the vehicle seat or on an edge section of the backrest.

In the case of a restraint system according to claim 12, it is also advantageous if the lower edge of the lower edge section is designed in a manner aligned with the oblique course of the diagonal belt section. The diagonal belt section crosses the chest of the occupant and thereby extends from a shoulder downwards to the other side of the occupant. The respective other shoulder is thus free, and thereby arises the problem, which has long been known in the case of restraint, of the occupant being rotated out of the safety belt. Due to the underside of the lower edge section which is aligned with the oblique course of the diagonal belt section, the main chamber has the greater extension downwards on the side of the free shoulder. This tendency can be countered by the proposed alignment of the underside of the lower edge section of the main chamber, since the occupant, when turning his free shoulder toward the front, pushes the main chamber forward and downward, and in the process is supported earlier, via the edge section extending further downwards at this side.

In this case, the safety belt can preferably be divided, by a belt tongue which can be locked in a belt buckle fixed to the vehicle, into the diagonal belt section and a lap belt section crossing the pelvis of the occupant, and the side of the lower edge section, which extends further downwards, faces the belt buckle. The earlier support of the occupant thus always takes place at the side of the occupant facing the belt buckle, which side, due to the belt geometry, also corresponds to the side of the free shoulder.

The invention is explained below using preferred embodiments with reference to the accompanying figures. In which:

DETAILED DESCRIPTION

Figure 1:
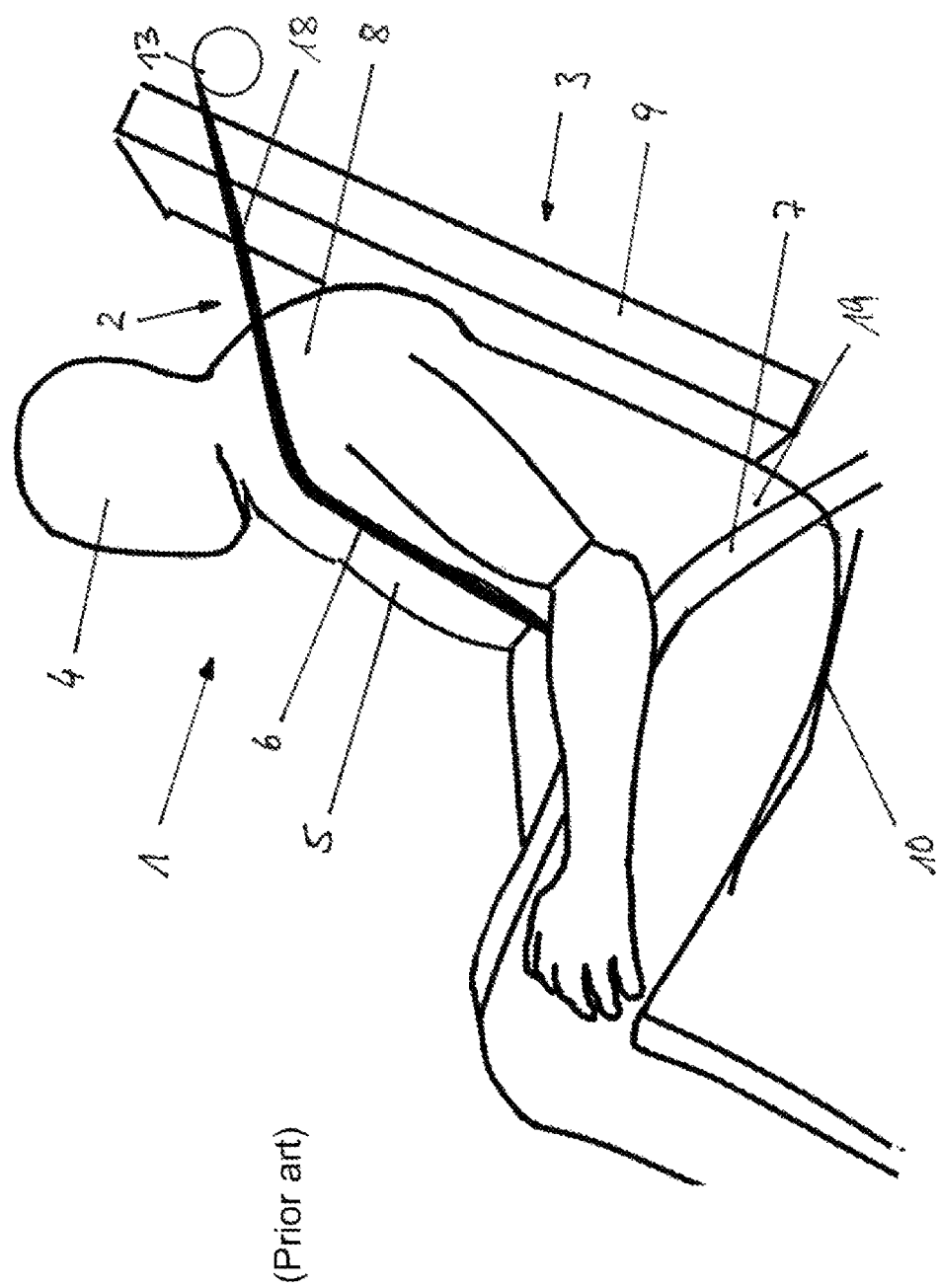
FIG. 1 shows a restraint system known in the prior art comprising a safety belt device having a safety belt in the form of a 3-point belt.

FIG. 1 shows a occupant 1 sitting in a vehicle seat 3 comprising a backrest 9 and a seat surface 10, which occupant is restrained by an applied safety belt 18 of a safety belt device 2. At its first upper end, the safety belt 18 is rolled onto a first belt retractor 13, and at its second lower end it is fastened, via an end fitting (not shown), to the vehicle structure or to the vehicle seat 3. The first belt retractor 13 can also either be fastened to the vehicle seat 3, as here, for example in the region of an upper edge of the backrest 9, or to the vehicle structure, it being possible for additional deflections of the safety belt 18 to be provided in the routing to the first belt retractor 13. A belt tongue 12, which can be seen only in the embodiment according to the invention in FIGS. 5 and 6, but which is also provided here, is displaceably guided on the safety belt 18, which belt tongue can be locked in a belt buckle 11 arranged on the other side of the vehicle seat 3, in relation to the end fitting and the first belt retractor 13. In a position locked in the belt buckle 11, the belt tongue 12 divides the safety belt 18 into a diagonal belt section 6 crossing the breast 5 of the occupant 1 and a lap belt section 7 crossing the pelvis 19 of the occupant 1. Additionally, additional irreversible or reversible belt tensioners and force-limiting devices can be provided on the first belt retractor 13, on the end fitting, or even on the belt buckle 12. To this extent, the safety belt device 2 corresponds to the prior art.

Figure 2:
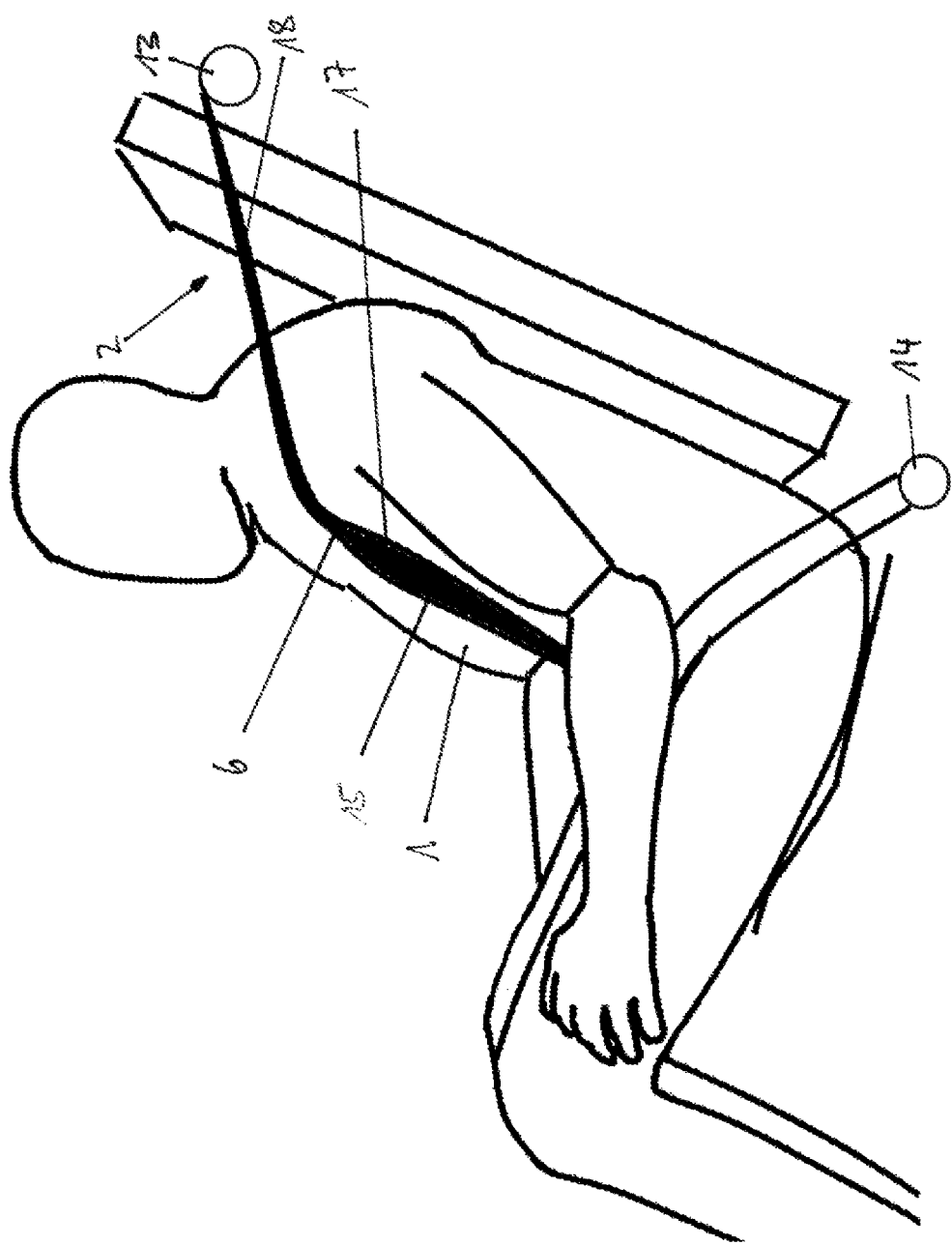
FIG. 2 shows a restraint system according to the invention comprising an airbag system according to the invention, in a normal buckled position, in a first perspective view.

FIG. 2 shows the occupant 1 with a restraint system designed according to the invention comprising a safety belt device 2 and an airbag system 15 according to the invention arranged on the diagonal belt section 6, the airbag system 15 being visible on the basis of a thickening of the safety belt 18 in the region of the diagonal belt section 6. Furthermore, a second belt retractor 14 is provided, which is provided instead of the end fitting and rolls up the safety belt 18 from the free end of the lap belt section 7. The lap belt section 7 and the diagonal belt section 6 can here preferably be designed as separate belt sections, in that they are fixedly connected to the belt tongue 12 by one end in each case. In this case, the belt tongue 12 is guided non-displaceably on the safety belt 18 and forms a separation between the lap belt section 7 and the diagonal belt section 6. The airbag system 15 is held and arranged on the diagonal belt section 6, via a retainer 17, in such a position that the diagonal belt section 6 can be completely wound up into the parked position via the first belt retractor 13, without the airbag system 15 having to be wound up using the first belt retractor 13. The retainer 17 can be part of the airbag system 15, for example in the form of loops provided on the airbag system 15, or even be a retainer 17 separate from the airbag system 15, it additionally also being possible for the retainer 17 to form a cover of the airbag system 15. The airbag system 15 comprises an airbag 20 which can be seen in FIGS. 3 to 6, and a gas generator 16 which can be seen in FIGS. 5 and 6 and is arranged on the belt buckle 11 in the embodiment shown. Alternatively, however, the gas generator 16 can also be arranged on the belt tongue 12 or on the first belt retractor 13.

Figure 3:
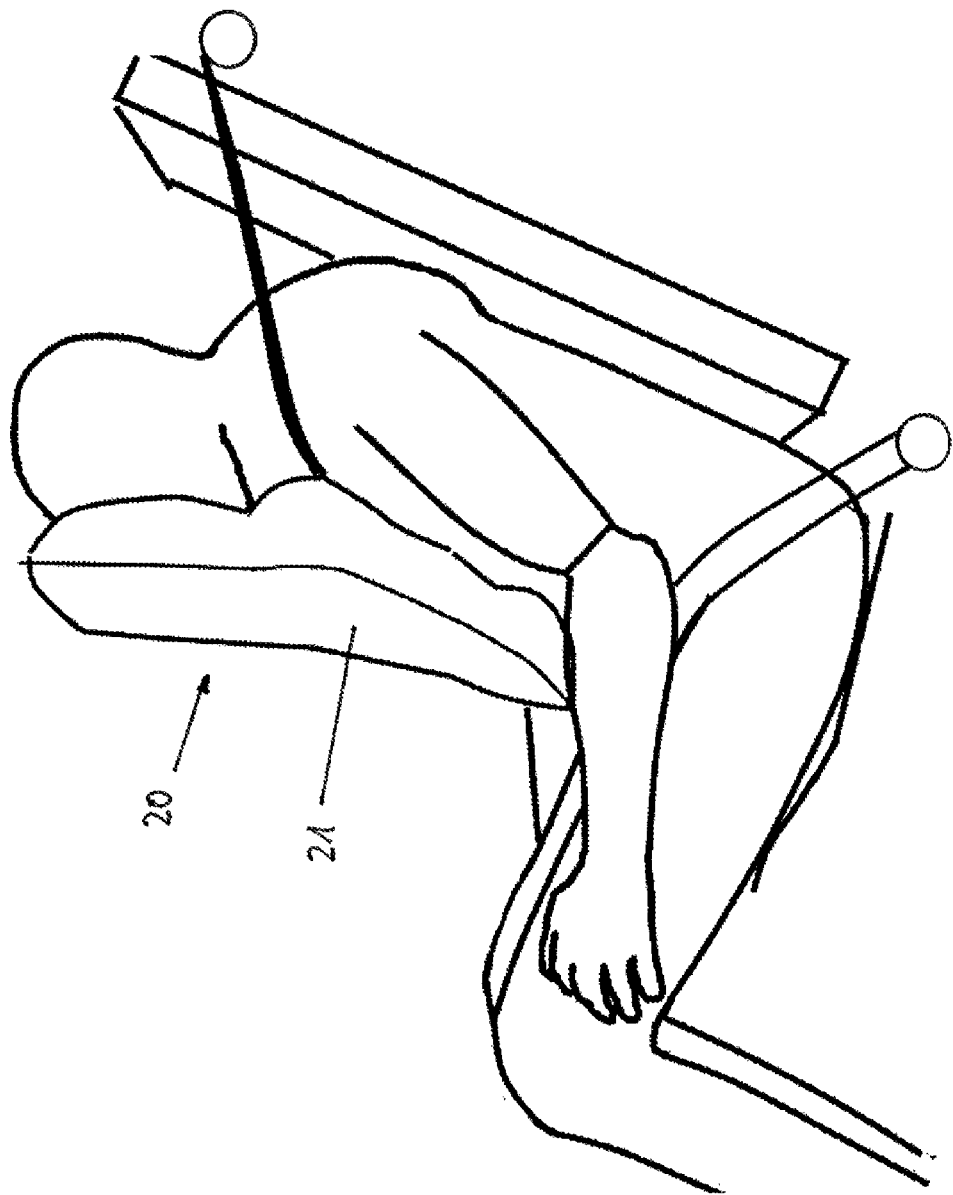
FIG. 3 shows the restraint system according to the invention according to FIG. 2 with an inflated main chamber.
Figure 4:
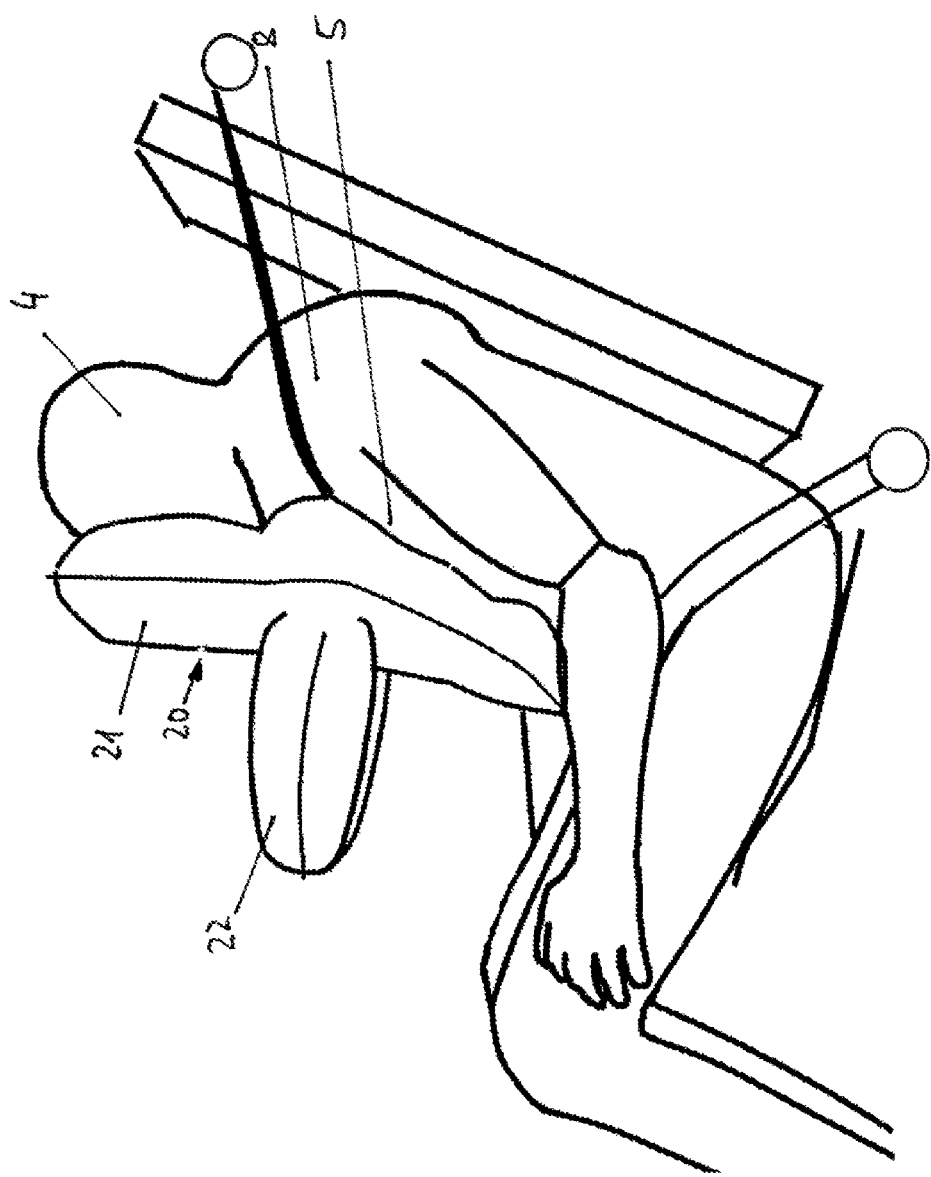
FIG. 4 shows the restraint system according to the invention according to FIG. 2 with an inflated main chamber and an inflated additional chamber.
Figure 5:
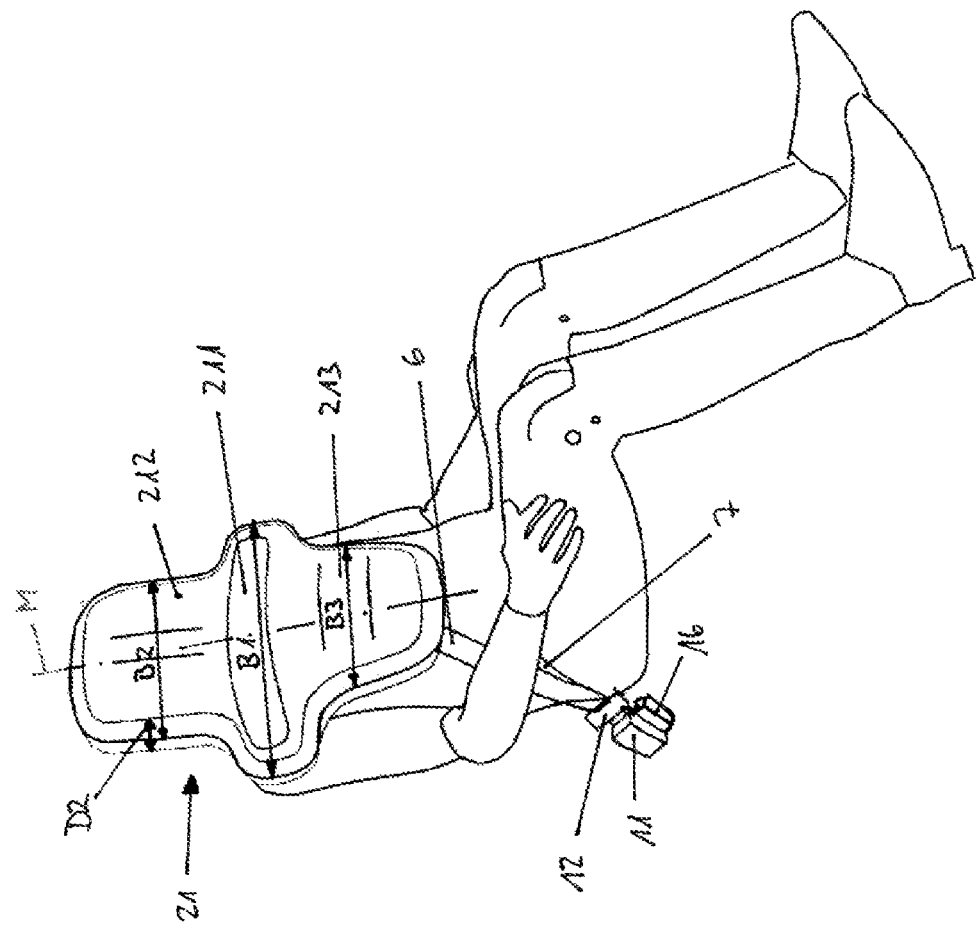
FIG. 5 shows the restraint system according to the invention with an inflated main chamber, in a second perspective view.
Figure 6:
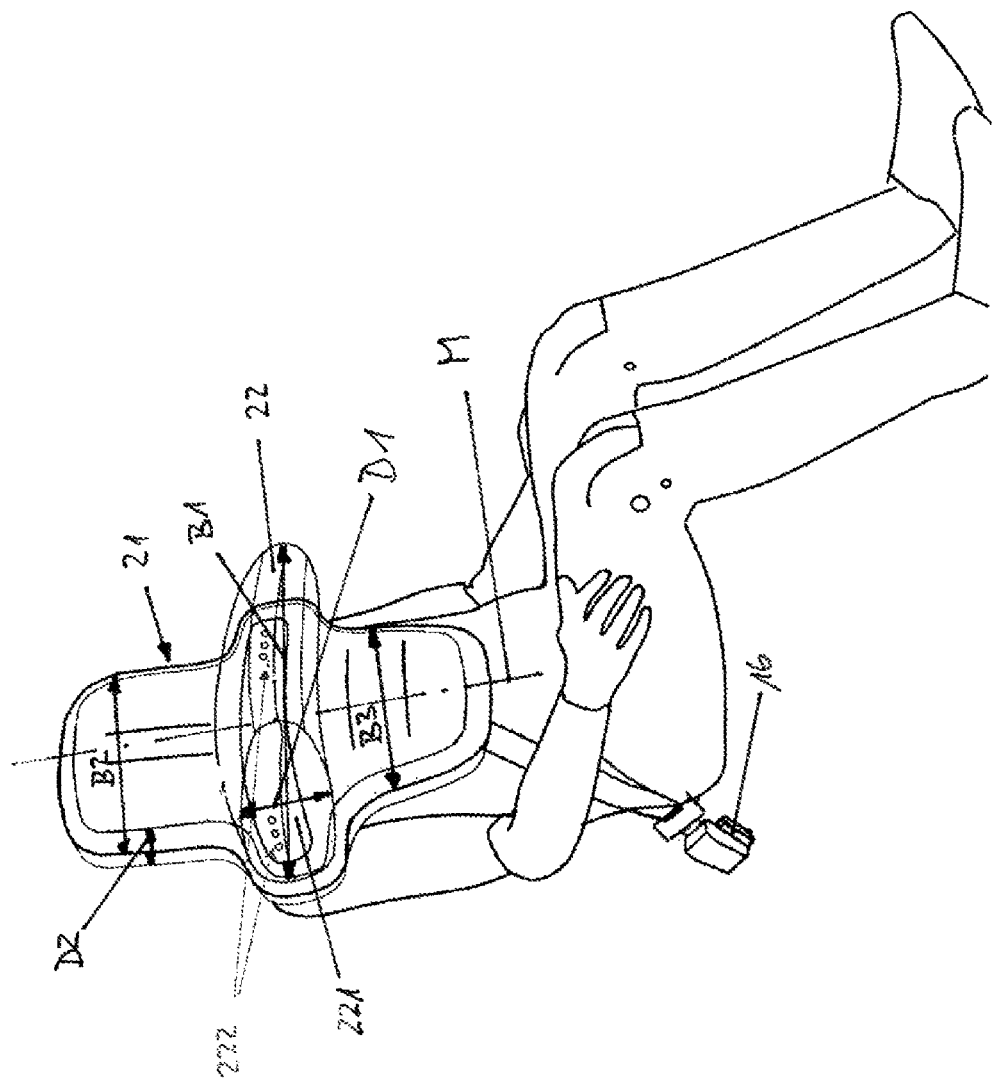
FIG. 6 shows the restraint system according to the invention with an inflated main chamber and an inflated additional chamber, in the second perspective view.

The airbag system 15 comprises a main chamber 21 which is fluidically connected to the gas generator 16 and which, when the gas generator 16 is activated, is inflated first via the fluidic connection, as can be seen in FIGS. 3 and 5. The main chamber 20 has an essentially constant thickness D2 apart from seams in the edge region and/or in the surface, and forms a substantially planar contact surface into which the heat 4 and the chest 5 of the occupant 1 plunge, as described in more detail below, during a forward displacement movement. Due to the fastening of the airbag system 15 to the diagonal belt section 6, the airbag system 15 is in this case held in position via the diagonal belt section 6, and the restraining forces to be absorbed during the forward displacement of the occupant 1 are absorbed by the diagonal belt section 6 and introduced into the vehicle structure via the fastening of the safety belt 18.

The main chamber 21 comprises a central section 211, which can be seen in FIG. 5 and has a maximum width B1, and which, after the main chamber 21 has been inflated, is positioned, on account of the position of the airbag system 15 defined by the retainer 17, in such a way that it is arranged approximately at the height of an upper edge of the backrest 9, and thereby restrains the occupant 1 in the region of his shoulder 8. The main chamber 21 furthermore has an upper edge section 212 which adjoins the central section 211 at the top and has a smaller width B2, and a downwardly extending lower edge section 213 having a smaller width B3, wherein the width B3 of the lower edge section 213 also decreases downwards. The upper edge section 212 is dimensioned and arranged such that, in the inflated state of the main chamber 21, it covers the front side of the head 4 of the occupant 1. The lower edge section 213 is dimensioned and arranged such that, in the inflated state of the main chamber 21, it covers the chest 5 of the occupant 1 below the shoulder 8. The main chamber 21 thus has a shape approximately like a diamond, which exercises its central restraining function for the occupant 1 over the wide and thus more dimensionally stable central section 211. The edge sections 212 and 213, in contrast, serve to restrain the head 4 and the chest 5 of the occupant 1 and, in the course of the forward displacement movement, adapt to the changing geometry and orientation of the upper body and of the head 4 of the occupant 1, the edge sections 212 and 213 being able, in this case, to perform a pivoting movement relative to the central section 211 so as to form an overall curved shape of the main chamber 21. The main chamber 21 is fluidically connected to the gas generator 16, for example by an inflation hose, and is inflated first when the gas generator 16 is activated. The central section 211 and the edge sections 212 and 213 have a symmetrical shaping with respect to a central axis M extending through the edge sections 212 and 213 and the central section 211, such that the main chamber 21 also has a symmetrical shape overall in relation to the central axis M.

Furthermore, the airbag 20 of the airbag system 15 has an additional chamber 22 which is arranged via a partition wall 221 on the central section 211 of the main chamber 21 and extends over the entire width B1 of the central section 211. Six openings 222 are provided in the partition wall 221, which openings enable an overflow of the gas from the main chamber 21 into the additional chamber 22, and thus form a fluidic connection between the main chamber 21 and the additional chamber 22. The openings 222 are arranged in each case in two groups of three openings 222, symmetrically to a central axis M extending through the edge sections 212 and 213 and the central section 211. Furthermore, the additional chamber 22 also has a shape symmetrical to the central axis M, so that the airbag 20 is also formed overall having the main chamber 21 and the additional chamber 22 symmetrical to the central axis M. In a cross-section oriented perpendicularly to the main chamber 21, the additional chamber 22 also has a protruding, tapering nose shape with a thickness D1 that decreases starting from the central section 211. The additional chamber 22 is arranged in the region of the central section 211, on the main chamber 21, and thus, in the inflated state, also in the region of the upper edge of the backrest 9 or in the region of the shoulder 8 of the occupant 1 who is belted in and is sitting in the vehicle seat 3.

When the gas generator 16 is activated, the main chamber 21 is inflated first and ideally restrains the occupant 1 in an early phase of the accident, before the forward displacement movement begins. The occupant 1 then falls into the main chamber 21 of the airbag 20 with his shoulder 8 in the region of the central section 211 and with the head 4 and chest 5 in the region of the edge sections 212 and 213, and is restrained thereby, in addition to the restraining force exerted by the diagonal belt section 6. In a time-delayed manner, the additional chamber 22 is then inflated via the openings 222, acting as a restrictor, by the overflow of the gas from the main chamber 21 into the additional chamber 22. The main chamber 21 and the additional chamber 22 are thus inflated stepwise and in a time-staggered manner, the internal pressure in the main chamber 21 being built up first, in order to exercise the restraining function for the occupant 1, before the built-up internal pressure is used for time-delayed inflation of the additional chamber 22. In this case, an internal pressure of approximately 10 kPa is built up in the additional chamber 22. By inflating the additional chamber 22, a type of spacer is created in front of the main chamber 21, it being possible for the additional chamber 22 to displace objects additionally present during the deployment or also to just simply fill out the available free space. This ensures that the available free space in front of the main chamber 21 for the forward displacement movement of the occupant is not restricted. Furthermore, the possible forward displacement path can even be increased in that the additional chamber 22 displaces objects, or simply in that it additionally holds or brings the main chamber 21 in/into position by means of a support at an external abutment before the beginning forward displacement movement of the occupant 1.

After the additional chamber 22 has been inflated, said chamber forms an additional damper for the forward displacement movement of the occupant, in that the additional chamber 22 is compressed during the forward displacement, and thereby dissipates energy. This energy dissipation contributes to the maximum load on the occupant being reduced during the forward displacement of the occupant 1 and in particular in the event of a subsequent non-avoidable impact on an internal structure of the vehicle. In this case, the tapered nose shape of the additional chamber 22 in cross-section is particularly advantageous, since the damping and the energy dissipation increase as a result, as the forward displacement path of the occupant 1 increases. Due to the symmetrical arrangement of the openings 222, in this case the additional chamber 22 is inflated as uniformly and symmetrically as possible over the width of the additional chamber 22.

Since the additional chamber 22 and the main chamber 21 themselves are formed symmetrically with respect to the central axis M, an identical restraint characteristic for identical angles of the impact can be realized from different directions relative to the central axis M. Furthermore, a progressive damping of the forward displacement movement of the occupant 1 is enabled by the nose shape of the additional chamber 22 that tapers in cross-section.

The described restraint system comprising the safety belt device 2 and the airbag system 15 is advantageous in particular because the airbag system 15 is always located in the same orientation relative to the occupant 1 sitting in the vehicle seat 3 due to the connection to the safety belt 18 when the safety belt 18 is being worn, irrespective of the position and orientation of the vehicle seat 3. This is expedient in particular in the case of partially or fully self-driving vehicles, in which the vehicle seats 3 can be adjusted in a substantially larger adjustment range in order that the occupants 1 can better use the freedoms obtained from autonomous driving. Furthermore, due to the connection to the safety belt 18 the airbag system 15 is located in the immediate or greatest possible proximity to the occupant 1 and is inflated virtually immediately in front of the occupant 1, so that the forward displacement movement of the occupant 1 is damped and controlled directly at the start. In the ideal case, additional airbag systems on the vehicle structure can be dispensed with owing to the advantages thus obtained, so that the entire restraint system is not only better for the occupant 1 but also more cost-effective.

Figure 7:
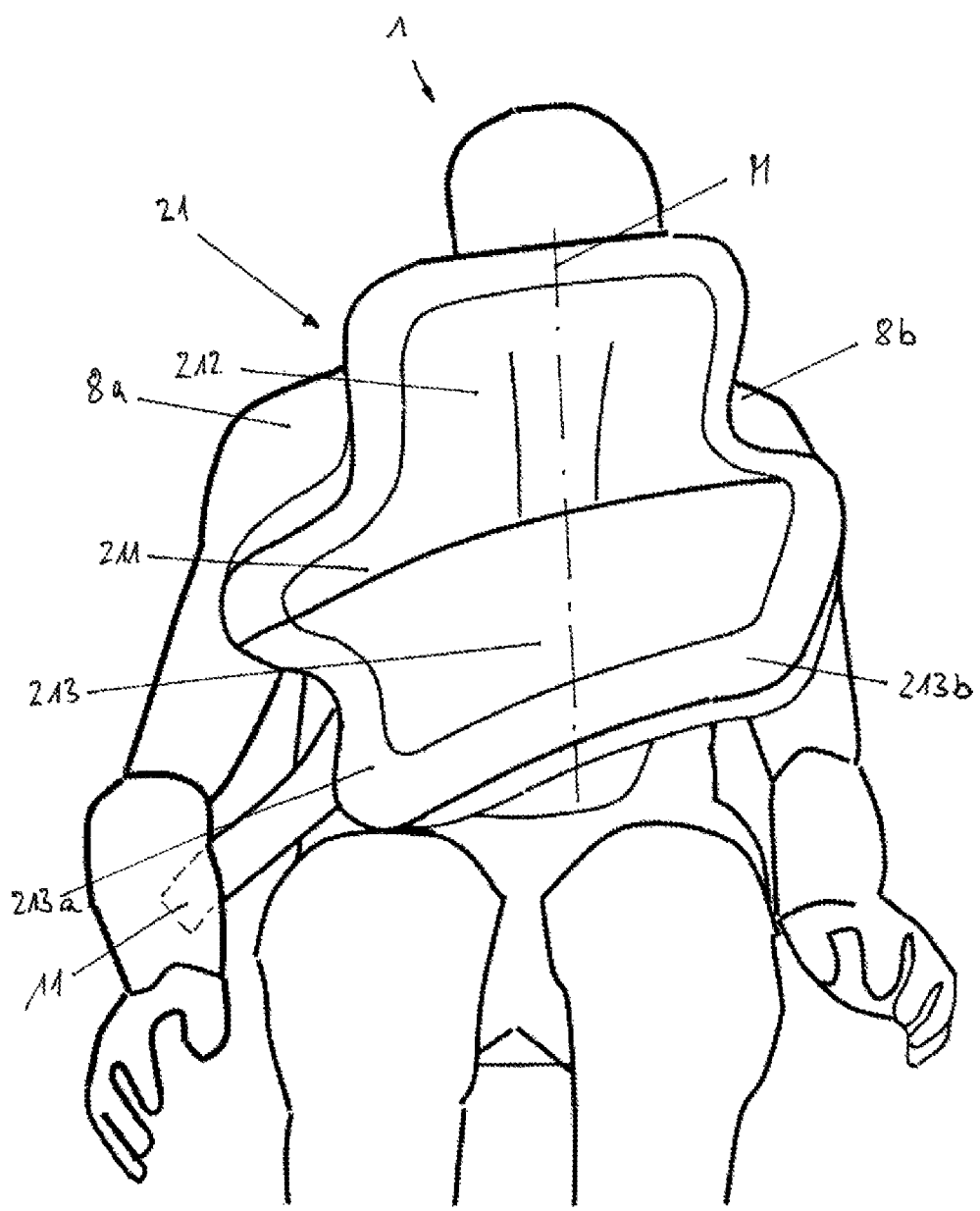
FIG. 7 shows a restraint system according to the invention with an inflated main chamber according to a second embodiment

FIG. 7 shows an alternative embodiment of the invention, in which the main chamber 21 is designed asymmetrically in relation to the central axis M, in that its lower edge section 213 has an underside which is oriented obliquely to a horizontal. The slope of the underside is in this case aligned with the diagonal belt section 6 running obliquely behind it. Starting from the right-hand side 8b of the shoulder 8 in the drawing, the diagonal belt section 6 extends downwards and to the left, to a belt buckle 11 covered by the occupant 1. The side 213a of the lower edge section 213 which extends further downwards is thus arranged on the side 8a of the shoulder 8 over which the diagonal belt section 6 does not extend, and which is thus free. Furthermore, the side 213a of the lower edge section 213 which extends further downwards always faces the vehicle interior of the vehicle seat and the belt buckles 11 in the case of a paired arrangement of vehicle seats and belt buckles 11 arranged between the vehicle seats 3 in each case.

Due to the proposed shaping of the lower edge section 213, the occupant 1 is restrained in an improved manner during forward displacement with respect to a rotational movement, in that he is restrained and supported earlier, by means of the main chamber 21 which is supported earlier, on the side of the free shoulder 8.

Figure 8:
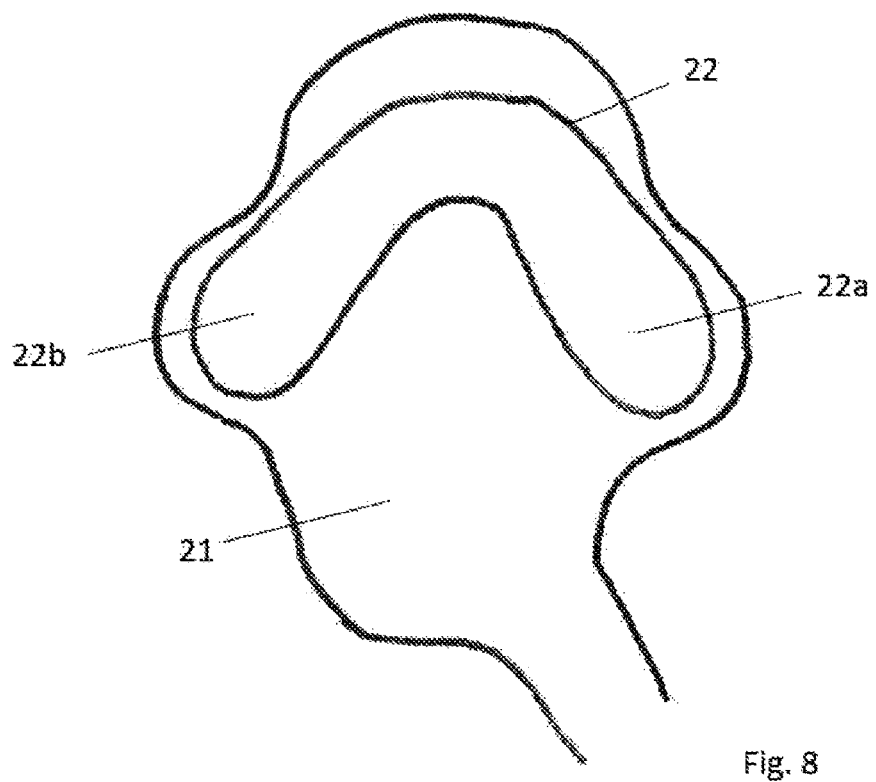
FIG. 8 is a sectional view, from the front, of an airbag system according to the invention, in a further embodiment.

FIG. 8 shows a further embodiment of the invention. Here, the additional chamber 22 is likewise arranged on the main chamber 21 and is filled via it. The additional chamber 22 is designed to be curved in cross-section, having two downwardly directed lobes (22a, 22b). A reduced rotation of the additional chamber 22 during filling can be achieved by this shaping. Furthermore, restraint is optimized in that the lobes (22a, 22b) extend to the right and left over the chest and upper body region of the occupant, and thus offer a particularly wide support surface.

While the above description constitutes the preferred embodiment of the present invention, it will be appreciated that the invention is susceptible to modification, variation and change without departing from the proper scope and fair meaning of the accompanying claims.

The invention claimed is:
1. An airbag system for a restraint system of a motor vehicle for restraining an occupant sitting in a vehicle seat by a safety belt device, having
an inflatable airbag, and
a gas generator which is fluidically connected to the airbag and which inflates the airbag when activated with a gas,
the airbag having a retainer for retaining the airbag on a safety belt of the safety belt device, wherein
the airbag has a main chamber which is fluidically connected to the gas generator and which, in a fastening position of the airbag system predetermined by the retainer, rests against the safety belt,
at least one additional chamber is provided on the side of the main chamber facing away from the safety belt and is separated from the main chamber by means of a partition wall disposed inside the inflatable airbag, and at least one opening provided in the partition wall, via which the additional chamber is fluidically connected to the main chamber, and wherein in the inflated form, the additional chamber has, in a cross-section oriented perpendicularly to the main chamber, a nose shape protruding from the main chamber and having a thickness decreasing starting from the main chamber.

2. The airbag system according to claim 1, wherein the additional chamber in the inflated form extends over the entire width of the main chamber.

3. The airbag system according to claim 1, wherein in the inflated state, the main chamber has a planar geometry having an approximately constant thickness.

4. The airbag system according to claim 3, wherein in the inflated state, the main chamber has a geometry with an elongated central section and two edge sections, the edge sections being arranged on the opposite elongate longitudinal sides of the central section and being of a smaller width than the central section.

5. The airbag system according to claim 4, wherein in the inflated state of the main chamber the central section and the edge sections form approximately one plane.

6. The airbag system according to claim 4, wherein the additional chamber is connected to the main chamber at the central section.

7. The airbag system according to claim 4, wherein in the inflated state, the main chamber and the additional chamber have a geometry that extends symmetrically to a central axis extending through the edge sections and the central section.

8. The airbag system according to claim 7, wherein at least two openings are provided in the partition wall, which openings are arranged symmetrically in relation to the central axis.

9. The airbag system according to claim 1, wherein
in the inflated state, the main chamber has a geometry that is asymmetrical in relation to a central axis extending through the edge sections and the central section, and
the lower edge section has a lower edge that extends obliquely in relation to a horizontal plane, wherein
the lower edge section extends further downwards on the side facing the vehicle interior than on the side facing the vehicle exterior.

10. A restraint system of a motor vehicle for restraining an occupant sitting in a vehicle seat by a safety belt device having a safety belt, wherein
the safety belt has a diagonal belt section that crosses a chest of the occupant,
wherein
an airbag system having the feature of claim 1 is arranged on the diagonal belt section.

11. The restraint system of a motor vehicle for restraining an occupant sitting in a vehicle seat by a safety belt device having a safety belt, wherein
the safety belt has a diagonal belt section that crosses a chest of the occupant, wherein
an airbag system having the features of claim 9 is arranged on the diagonal belt section.

12. The restraint system according to claim 10, wherein the airbag system is positioned on the diagonal belt section by means of a holder in such a way that the inflated main chamber is arranged with the central section at the height of an upper edge of a backrest of the vehicle seat.

13. The restraint system according to claim 10, wherein the safety belt device has two belt retractors which roll up the safety belt from different ends.

14. The restraint system according to claim 11, wherein the lower edge of the lower edge section is designed in a manner aligned to the oblique course of the diagonal belt section.

15. The restraint system according to claim 14, wherein
the safety belt can be divided into the diagonal belt section and a lap belt section crossing the pelvis of the occupant, by a belt tongue that can be locked in a belt buckle fastened to the vehicle, and
the side of the lower edge section, which extends further downwards, faces the belt buckle.

16. An airbag system for a restraint system of a motor vehicle for restraining an occupant sitting in a vehicle seat by a safety belt device, having
an inflatable airbag, and
a gas generator which is fluidically connected to the airbag and which inflates the airbag when activated with a gas,
the airbag having a retainer for retaining the airbag on a safety belt of the safety belt device, wherein
the airbag has a main chamber which is fluidically connected to the gas generator and which, in a fastening position of the airbag system predetermined by the retainer, rests against the safety belt,
at least one additional chamber is provided on the side of the main chamber facing away from the safety belt and is separated from the main chamber by means of a partition wall disposed inside the inflatable airbag, and
at least one opening provided in the partition wall, via which the additional chamber is fluidically connected to the main chamber, and
wherein, in the inflated state, the main chamber has a geometry with an elongated central section and two edge sections, the edge sections being arranged on the opposite elongate longitudinal sides of the central section and being of a smaller width than the central section.

* * * * *